INVENTOR.
EDWIN E. CONLEY
BY
Fishburn and Gold
ATTORNEYS

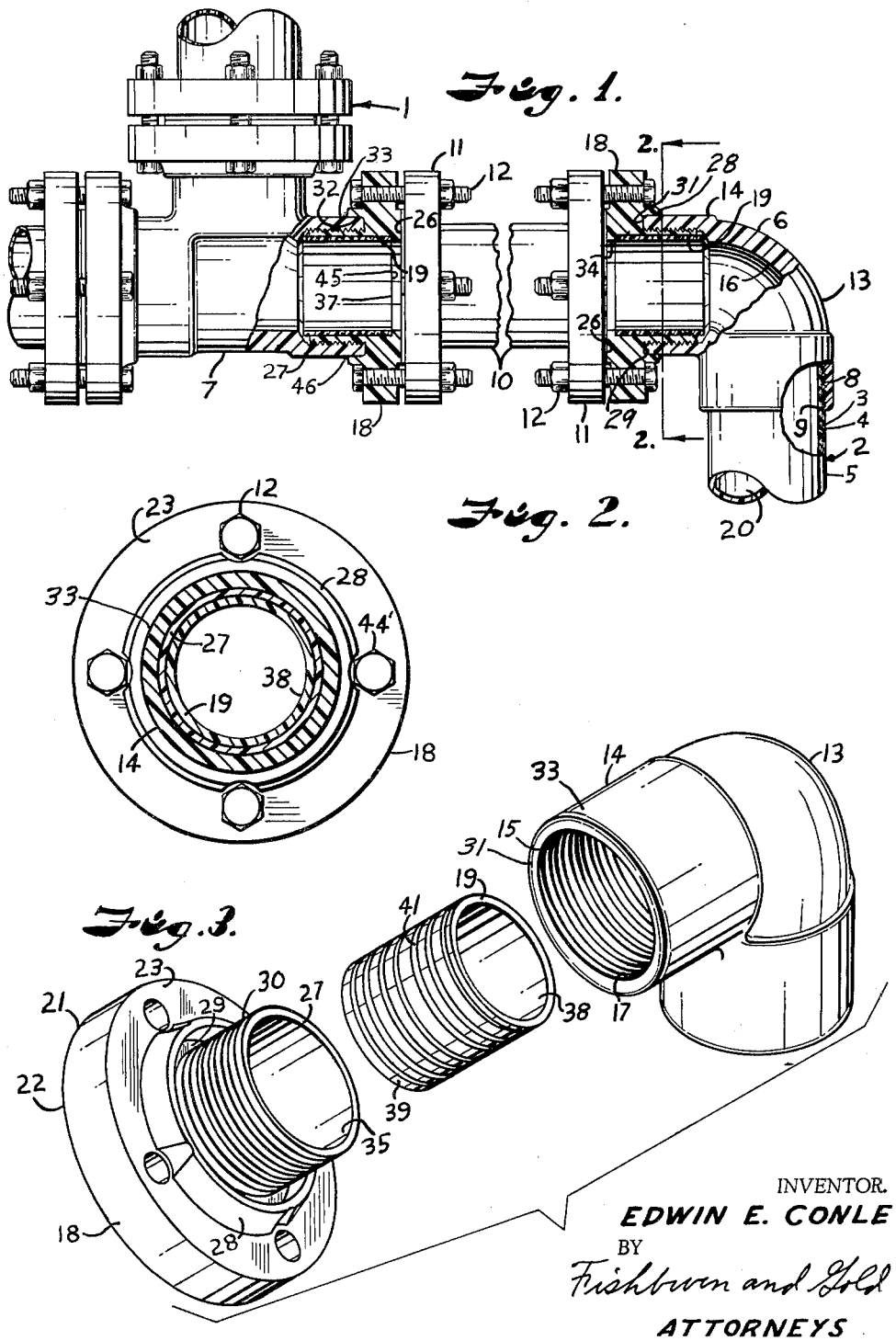

États-Unis Patent Office 3,224,795
Patented Dec. 21, 1965

3,224,795
FLANGED FITTING WITH A REINFORCING
SLEEVE
Edwin E. Conley, Tulsa, Okla., assignor to Conley Corporation, Tulsa, Okla., a corporation of Oklahoma
Filed Sept. 27, 1962, Ser. No. 226,535
7 Claims. (Cl. 285—114)

This invention relates to piping structures, and more particularly to connections for plastic pipe and fittings and methods of making such plastic fittings for connection of plastic pipe.

In the use of plastic pipe and fittings in the making of pressure flow systems, there may be a number of sizes of pipe and, therefore, a number of different sizes and types of fittings, and also the connections of the pipe and the various fittings may be threaded connections, cemented connections, or flange connections, necessitating a large inventory to maintain a supply of all of the different sizes and types of fittings both in the threaded type and flanged type and the like. Also, due to the cost of molds and time required for placing of materials in molds particularly for making of fiberglass reinforced flanged fittings, there have been attempts to fabricate such fittings by the making of fittings having plain ends or branches and the making of flanges as separate pieces and then sleeving the flange on the end of the plain fitting and cementing of the parts together. However, such fabricated structures have not proven satisfactory due to small areas of cement bond and thin unsupported walls that have resulted in fracture or failure.

The principal objects of the present invention are to provide a reinforced plastic flanged fitting and method of fabrication thereof that is durable and that will withstand stress applied between the flange and the body of the fitting; to provide a reinforced plastic flanged fitting that consists of a flange member secured and bonded to an open end of a standard threaded or plain fitting body with cooperating portions sleeved and bonded together to provide great strength at the portion from which the flange extends; to provide such a structure wherein the standard and flanged fittings are available from a small inventory of the standard fittings which may be usable in standard connections and an inventory of separate flanges and sleeves which may be quickly and easily applied to the standard fitting to convert same to a desired flanged fitting; to provide a structure wherein the parts are economically made for desired strength; and to provide fitting structures that are economical to manufacture and are easily assembled to form strong, practical flanged fittings for use in pressure flow systems of plastic pipe and fittings.

Other objects and advantages of this invention will become apparent from the following description taken in connection with the accompanying drawings wherein are set forth by way of illustration and example certain embodiments of this invention.

FIG. 1 is an elevational view of connected plastic pipe and fittings in a pressure flow system with portions broken away to show the structure of the pipe and connections particularly at the flanged ends of the fittings.

FIG. 2 is a transverse sectional view through a fitting taken on the line 2—2, FIG. 1.

FIG. 3 is a disassembled perspective view of the parts forming a flanged end of a fitting.

Figure 4:
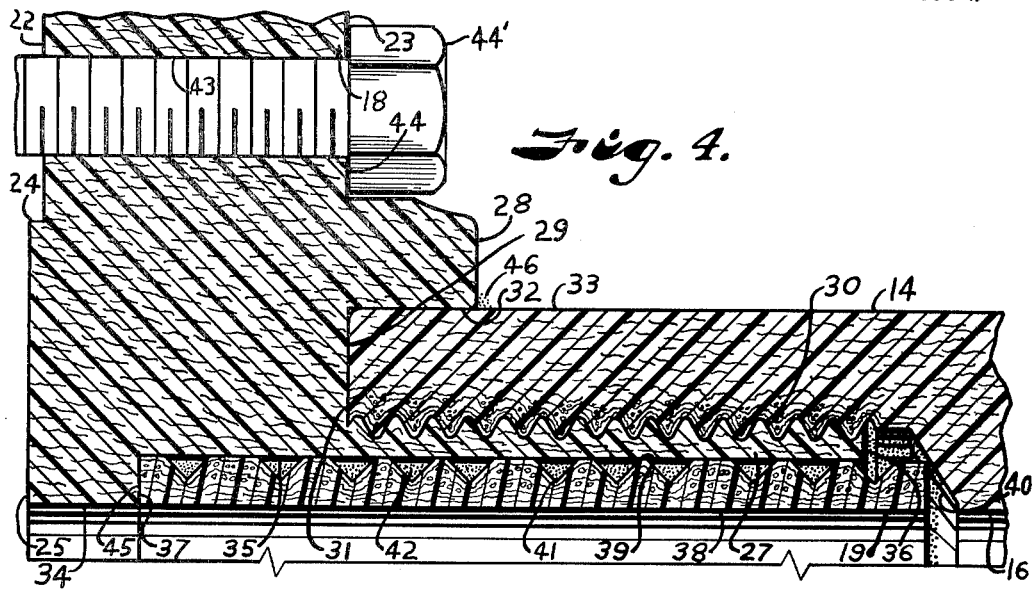
FIG. 4 is a greatly enlarged partial sectional view through a fitting end or branch and flange illustrating the assembled relation of the parts thereof.

Referring more in detail to the drawings:

1 generally designates a pressure flow system of plastic pipe and fittings which preferably includes rigid plastic pipe 2 that is cast or formed of suitable synthetic resin reinforced with fiber strands 3 and fabric 4 such as glass fibers embedded in the wall 5 of the pipe with the fiber strands extending generally circumferentially to provide a structure adapted to withstand high loop stress. Such rigid plastic pipe has ends of suitable structure for making connection with fiberglass reinforced cast or molded fittings such as L's 6, T's 7 or other pipe fitting bodies. The pipe ends may have external threads 8 adapted to be threaded into internally threaded end portions 9 of threaded pipe fittings, or the pipe sections 10 may have flanges 11 at ends thereof adapted to be connected as by suitable fastening devices such as bolts 12 to flanged pipe fittings.

In flow systems, the pipe and fitting connections may be of cemented joints or threaded joints or flanged joints and frequently such a system may have both flanged and threaded joints or cemented joints in the same system, depending upon the requirements in the installation and particularly upon the necessity of having separable portions in the system. The fitting structures embodying the features of the present invention preferably include basic fitting body portions 13 having branches or ends 14 adapted for connection directly to pipe, as for example, the basic fittings have bores 15 communicating with inner ends of counterbores 16 adjacent the ends of the branches and, in the structure illustrated in FIGS. 1 to 4 inclusive, said branches have internal threads 17 in the portions 9 which are preferably of suitable standard form and tapered from the branch end whereby external threads 8 on pipe ends may be screwed therein. Such basic fittings 13 may be manufactured with molded threads in accordance with the disclosure of the Conley Patent No. 2,751,237 issued June 19, 1956. The flanged fittings such as L, T, and the like consist of basic fittings of bodies 13 together with a flanged member 18 and a reinforcing sleeve 19 assembled on a branch or end of the basic fitting or body 13 to form the flanged end thereof.

In the structure illustrated in FIGS. 1 to 4 inclusive, the bore 15 of the basic fitting or body 13 is preferably substantially the same size or diameter as the bore 20 of the pipe 2. The flange member 18 has a disc-like portion 21 with opposed faces 22 and 23 with an inner ring portion 24 extending slightly from the face 22 and provided with a face 25 adapted to engage a corresponding face 26 of a flange 11 adapted to be connected thereto. The flanged member 18 has a tubular member 27 extending axially therefrom and a ring portion 28 spaced outwardly from the tubular member 27 and concentric therewith, the ring portion and tubular portion extending from the face 23 of the disc. The face portion 29 between the ring portion 28 and the tubular member 27 is preferably substantially in the same plane as the face 23 with the tubular member 27 slightly shorter than the threaded counterbore in the ends of the basic fitting branches 14. The tubular member 27 has an external thread 30 corresponding to the threads 17 in the basic fitting counterbores whereby the external threads on the tubular member 27 are adapted to be threaded into the internally threaded counterbores 16 of the basic fitting to make a tight joint with the end faces 31 of the branch substantially engaging the face 29 of the flange portion. Also, when assembled, the inner surface 32 of the ring portion 28 engages the outer surface or periphery 33 of the branch or end of the respective basic fitting body. The flange member 18 has a bore 34 extending from the face 22 and preferably substantially the same size as the bore 20 in the pipe adapted to be connected thereto. A counterbore 35 extends from the end 36 of the tubular member 27 and terminates in a shoulder 37 spaced from the face 22 as illustrated in FIG. 4.

The sleeve 19 preferably has a bore 38 corresponding to the bore 34 and an outer periphery 39 that provides a slip fit into the counterbore 35, the sleeve preferably being of such length that it extends from the shoulder 37 substantially to the end 40 of the threaded counterbore 16 in the ends of the basic fitting 13, as illustrated in FIG. 4. The sleeve 19 has a plurality of longitudinally spaced circumferential grooves 41 for receiving adhesive 42 as later described.

The flange members 18 preferably have a plurality of circumferentially spaced openings 43 adapted to register with corresponding openings in a flange 11 to be secured thereto for receiving shanks 44 of bolts 44' for securing the flanges together to make a tight flanged joint. The basic fittings or bodies 13, flange members 18 and sleeves 19 are preferably molded or otherwise formed of suitable reinforced resins to form rigid structures, as for example fiberglass reinforced epoxy resins, or other suitable resins used in the rigid plastic pipe industry.

In assembling a flanged fitting constructed as described, the desired basic fitting or body 13 having the threaded ends, the flange members 18 and sleeves 19 therefor are provided, and then the outer grooved surface of the sleeve 19 is coated with a fluid or paste of settable appropriate plastic resin or adhesive 42 which will adequately serve as a satisfactory sealing or cementing agent in a finished joint. The same plastic resin 42 is also applied to the external threads of the tubular member 27. The sleeve 19 is then inserted into the counterbore 35 of the flange member and moved until the end 45 thereof engages the shoulder 37. The flange member 18 with the sleeve therein is then positioned to align the externally threaded tubular member 27 with the threaded bore of the branch of the fitting, and said tubular member threaded into said threaded bore and, in screwing the parts together, the plastic resin adhesive or cement is partially squeezed out between the end 31 of the branch and the face 29 and also between the surface 32 and the surface 33. The threading is continued until the end of the branch engages the surface 29, as illustrated in FIG. 4. Some of the adhesive will collect as at 46 to form a bead or weld between the end of the ring portion 28 and the peripheral surface 33 of the branch end, as illustrated in FIG. 4.

The plastic fluid settable material or cement is preferably such as the well known epoxy resins or of such types that are tough, non-cracking and substantially non-shrinking when set, and may include modified phenol formaldehyde, the epichlorohydrins, poly esters or similar material that will set up permanently in a joint as a solid and effective seal without cracking or other failure. After the flange portion is tightened onto the basic fitting to form a tight connection, the thermoplastic cement is allowed to cure to provide a tight seal and bond between the sleeve and flange member and between the threads of the tubular member and the basic fitting and between the flange at the face 29 and the ring portion 28 and the surface of the end portion of the basic fitting branch forming a rigid strong structure wherein the ring portion 28 provides reinforcement, adding additional strength and preventing concentration of stress at the tubular portion and sleeve adjacent the end of the branch. Also, the separate sleeve lends itself to manufacturing methods and the application of fiber reinforcements and strands, particularly circumferentially thereof, to withstand high hoop stress not possible of attainment in the molding of portions of a molded flange member.

Figure 6:
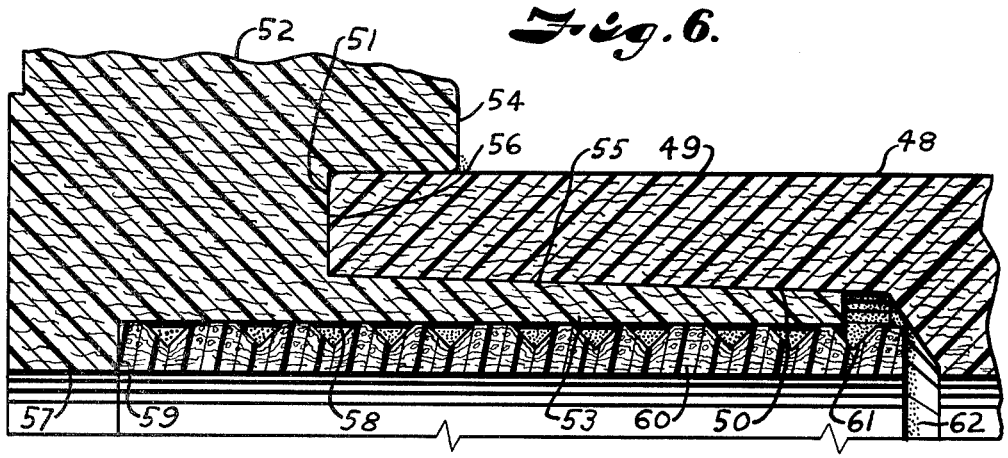
FIG. 6 is a greatly enlarged partial sectional view through the connection of the flange and fitting in the modified form.
Figure 5:
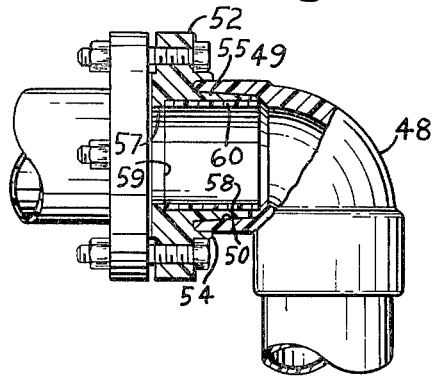
FIG. 5 is an elevational view of a pressure flow system with portions broken away to show a modified form of connection of the flange and fitting.

In the structures illustrated in FIGS. 5 and 6, the basic fitting or body 48 has end portions or branches 49 with inwardly tapering bores 50 from the ends 51 adapted for wedging action in cemented joints with rigid plastic pipe. The flange member 52 has concentric tubular members 53 and 54 with the periphery 55 of the tubular member extending from the face 56 of the flange between the tubular member and ring portion 54 and tapered to correspond to the taper of the bore 50. The flange member has a bore 57 and a counterbore 58 that define a shoulder 59 with a sleeve 60 adapted to be positioned in the counterbore, as illustrated in FIG. 6. The sleeve 60 is provided with circumferential grooves 61 and, in the assembly, cement 62 is positioned on the sleeve and coated on the surfaces to be engaged, the sleeve 60 is placed in the counterbore of the flange member, and the tubular member of the flange member inserted into the tapered bore 50 to form a tight press fit with the adhesive coating surfaces engaged whereby on setting of the adhesive a rigid, strong structure is formed. The structure shown in the modified form is substantially the same as that of the preferred form except that cemented tapered surfaces of the tubular portion and the branch end of the basic fitting or body are adhered by adhesive in a press fit arrangement instead of a threaded connection.

It is believed obvious that this invention provides a flange fitting and method of making same which provides the use of parts in an inventory for various purposes, thereby reducing investment but providing for the making of the flanged fittings in an efficient, economical manner with the finished flanged fittings of exceptional strength and durability.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:
1. A flanged pipe fitting for pressure flow systems of plastic pipe and fittings comprising,
 (a) a fiber reinforced plastic pipe fitting body having an open ended branch with a pipe end receiving socket extending inwardly from said open end,
 (b) said branch having an outer peripheral surface adjacent said open end,
 (c) a flange member having opposed faces with an axial tubular member extending from one of said faces and having an outer periphery adapted to engage in the socket of said branch,
 (d) a concentric ring portion on said flange member and extending from said one face and having an inner periphery engaging the outer periphery of the branch and when said tubular member is engaged in said socket,
 (e) said flange member having an axial bore and a counterbore extending from adjacent the other face of the flange member through said tubular member,
 (f) a fiber reinforced plastic tubular sleeve fitting in said counterbore and extending for the length thereof, said sleeve having circumferential reinforcing fibers,
 (g) and a thermosetting plastic resin material on the engaged surfaces of said sleeve, counterbore, tubular member and socket, branch end, flange member and concentric ring member to bond same together.

2. The flanged pipe fitting as set forth in claim 1 wherein,
 (a) said sleeve has a plurality of circumferential grooves spaced longitudinally of the outer surface thereof.

3. A flanged pipe fitting as set forth in claim 1 wherein,
 (a) the branch socket has internal threads therein and the tubular member has external threads thereon threaded into the threaded socket.

4. A flanged pipe fitting as set forth in claim 1 wherein,
 (a) the branch socket tapers inwardly from the open end thereof and the tubular member has an outer periphery having a corresponding taper to the socket.

5. A flanged pipe fitting as set forth in claim 4 wherein,
 (a) the branch socket has internal threads therein and the tubular member has external threads thereon threaded into the threaded socket.

6. A flanged pipe fitting for pressure flow systems of plastic pipe and fittings comprising,
 (a) a fiber reinforced plastic pipe fitting body having a bore and an open ended branch with an internally threaded portion adjacent said open end communicating with said bore,
 (b) said bore substantially corresponding to the bore of a pipe adapted to be connected to said fitting at said open end,
 (c) said open ended branch having a cylindrical outer peripheral surface,
 (d) a flange member having opposed faces,
 (e) a tubular member integral with said flange member and extending from one face thereof with external threads on said tubular member adapted to be screwed into the internal threads of said branch,
 (f) a ring member on said flange member and extending from said one face in concentric relation to said tubular member and having an inner periphery adapted to engage the outer peripheral surface of said branch end,
 (g) said flange member having an axial bore adjacent the other face thereof and a counterbore extending from adjacent said other face to the extremity of said tubular member,
 (h) a fiber reinforced plastic sleeve fitting in said counterbore and extending for the length thereof with said sleeve having circumferential reinforcing fibers therein, said sleeve having an internal bore substantially corresponding to the flange bore and the bore of said fitting body,
 (i) and a thermosetting plastic resin material on the engaged surfaces of said sleeve, tubular member, internal and external threads, branch and periphery and ring member for bonding same together.

7. The flanged pipe fitting as set forth in claim 6 wherein said sleeve has a plurality of circumferential grooves spaced longitudinally of the outer surface thereof.

References Cited by the Examiner

UNITED STATES PATENTS

| 761,643 | 6/1904 | Backman | 285—331 |
| 807,662 | 12/1905 | Crowther | 285—238 |
| 1,185,215 | 5/1916 | Lezzeni | 285—255 |
| 1,474,905 | 11/1923 | Keszthelyi | 285—390 X |
| 2,782,806 | 2/1957 | Stambaugh et al. | 285—416 |
| 2,998,269 | 8/1961 | Houghton | 285—423 |
| 3,001,673 | 9/1961 | Brown | 285—331 |
| 3,123,072 | 3/1964 | Bellamy | 285—260 X |

FOREIGN PATENTS 885,148   5/1943   France.

CARL W. TOMLIN, *Primary Examiner.*